Aug. 25, 1959   G. A. CUTSOGEORGE   2,901,740
ELECTRICAL NETWORK AUTOMATICALLY RESPONSIVE
TO A CHANGE IN CONDITION
Filed Nov. 23, 1956
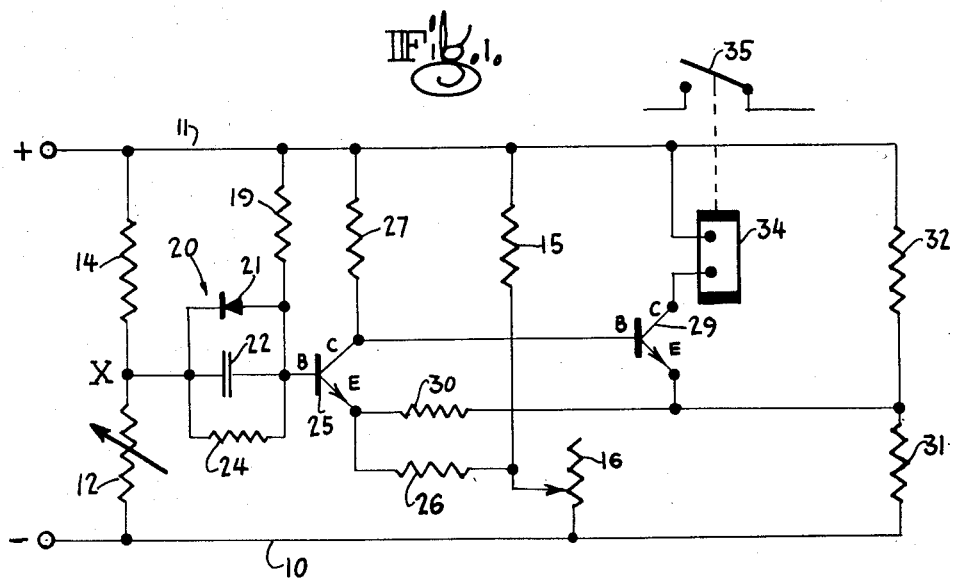
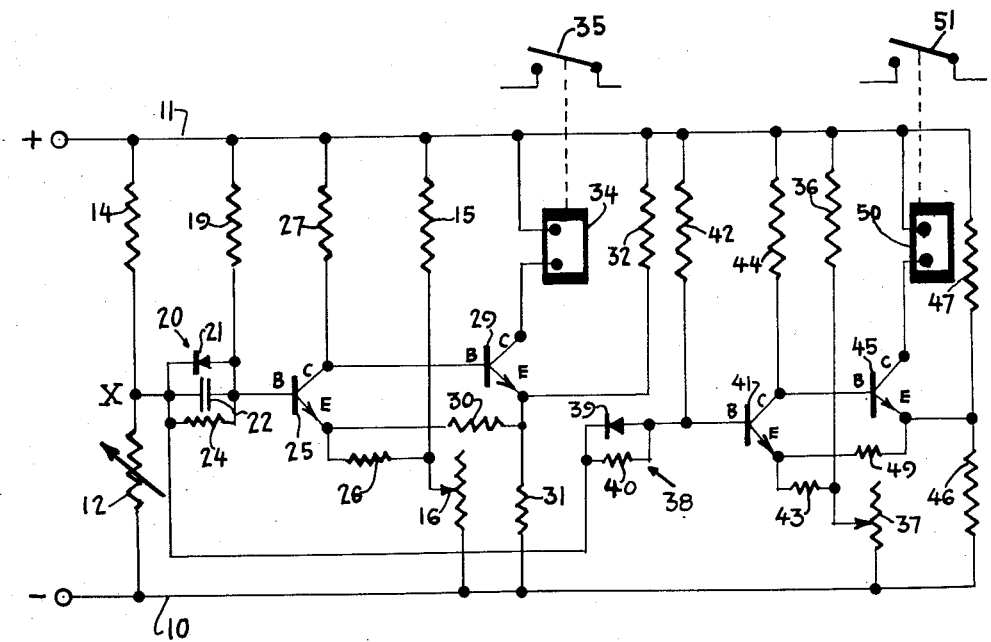
INVENTOR
George A. Cutsogeorge
BY
John A. Read
AGENT United States Patent Office 2,901,740
Patented Aug. 25, 1959

2,901,740

ELECTRICAL NETWORK AUTOMATICALLY RESPONSIVE TO A CHANGE IN CONDITION

George A. Cutsogeorge, Elizabeth, N.J., assignor to Specialties Development Corporation, Belleville, N.J., a corporation of New Jersey Application November 23, 1956, Serial No. 624,074

12 Claims. (Cl. 340—233)

The present invention relates to electrical networks which are automatically responsive to a change in a condition and, more particularly, to such networks which are responsive both to rate of change of such condition and to a predetermined change of the condition, and are self-resetting when the initial condition has been restored.

Although useful for many other purposes, the present invention is primarily concerned with improving heat and flame detecting systems using a sensing element of the thermistor type. Such elements may comprise two electrical conductors spaced apart by a material having an infinitely high resistance at a normal temperature to render it substantially non-conductive to electricity and having the characteristic of being rendered conductive at an abnormal temperature. Suitable means indicate or operate various devices when the abnormal temperature condition has been detected.

Heretofore, it has been common practice to employ sensitive polarity indicating devices having balanced, moving armatures with electrical contacts to detect the presence of abnormal conditions sensed by the thermistor. Such devices have the drawbacks of requiring vibration isolation and of using make and break contacts which through wear or corrosion tend to alter the operating characteristics of the system to the detriment of reliability.

Accordingly, the primary object of the present invention is to provide an improved network of such a type which is also capable of successfully withstanding rigorous environmental conditions without failure.

Another object is to provide such a network which requires no vibration isolation for installation in locations such as aircraft or automotive instrument compartments.

Another object is to provide such a network which has a long and useful life and requires a minimum of maintenance or repair.

Another object is to provide an improved network which is capable of detecting either a rapidly propagated blaze or a smoldering fire condition.

Another object is to provide such a network which is constructed of a minimum number of components adapted to be arranged in a compact and lightweight manner.

Another object is to provide such a network which has utility in many fields of application.

A still further object to is to accomplish the foregoing in a simple and practical manner.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, it has been found that the foregoing objects can be accomplished by providing a condition responsive system which generally comprises a source of direct current, first and second resistors connected in series across the source and third and fourth resistors connected in series across the source to provide a voltage dividing bridge which is normally unbalanced in one direction. One of the resistors, for instance the first, is of a type which changes in value, in response to a change in the predetermined condition, to another value such that the bridge goes toward unbalance in the opposite direction. Connected across the output of the bridge is a junction type transistor, having its input or base-emitter circuit adapted to sense the bridge error. The output, or collector-emitter circuit, controls the flow of current through an electrically operable device, such as an alarm or a relay.

A modification of the foregoing is provided by adding an ambient temperature compensating network, composed of a diode arranged in parallel with a resetting resistor which is in series with the transistor input circuit.

A further modification is provided by adding a capacitor in parallel with the temperature compensating network of the foregoing.

A further modification is provided by adding a second transistor between the first transistor and the electrically operable device to amplify the output of the first transistor.

A still further modification is provided by adding a fifth and a sixth resistor in series across the source in the foregoing system which, together with the first and second resistors, form a second voltage dividing bridge normally unbalanced in one direction, and which goes toward unbalance in the opposite direction independently in response to a change in the predetermined condition. A second detecting transistor, which has its input circuit arranged to sense bridge error and its output circuit controlling the flow of current from a power source to a second electrically operable device, is connected across the output of the second bridge with or without the inclusion of the temperature compensating and rate sensitive modifications.

A preferred embodiment of the invention has been chosen for purposes of illustration and description, and is shown in the accompanying drawing, forming a part of the specification, wherein:

Fig. 1 is a circuit diagram illustrating the essential components arranged in a system in accordance with the invention.

Fig. 2 is a modification of the system shown in Fig. 1.

Referring to Fig. 1 of the drawing, a network is shown which essentially comprises a source of unidirectional electrical current represented by conductors 10 and 11, a condition sensing resistor 12 such as a thermistor (first resistance element) a pair of fixed resistors 14 and 15 (second and fourth resistance elements) and a variable resistor or rheostat 16 (third resistance element) all of which constitute a voltage dividing bridge. The resistor 16 as shown herein is adapted for adjustment to provide a wide range of unbalance settings. It will be seen that the bridge output from which the error polarity is sensed is between the junctions of the resistance elements 12 and 14, and 15 and 16.

A parallel rate-sensitive network 20, which comprises a compensating diode 21, a capacitor 22 and a resetting resistor 24, is shown connected to the junction of the resistance elements 12 and 14. The other side of the parallel network 20 is connected to the base B of a detecting transistor 25 and to the positive side of the source by way of a bias resistor 19. The transistor 25 is of the N–P–N junction type which requires a positive voltage bias between base and emitter for conduction and, as shown, is connected with its input or base-emitter circuit adapted to sense the bridge error. The emitter of the transistor 25 is connected to the junction of 15 and 16 by way of a limiting resistor 26. The collector C and the transistor 25 is connected to the positive side of the current source 11 by way of a load resistor 27 and to the base B of an amplifying transistor 29. For purposes of basic consideration and illustration, the transistors 25 and 29 are of the same type and class and have perfect on-off characteristics.

The emitter of the transistor 29 is connected to the emitter of the transistor 25 by way of a coupling resistor 30 and to the junction of a pair of voltage range limiting resistors 31 and 32. The collector C of the transistor 29 is connected in series with a load 34 to the positive side of the current source 11. As shown herein, the load is a relay which mechanically actuates a switch 35 of an external indicator circuit, not shown.

Referring now to Fig. 2, there is shown the bridge circuitry illustrated in and described with reference to Fig. 1 to which have been added a pair of bridge resistors 36 and 37 which share the resistors 12 and 14 of the first bridge to form a second bridge circuit. Similar to the first bridge, the output of the second bridge is across the junctions of the resistance elements 12 and 14, and 36 and 37. Connected to the junction of resistors 12 and 14, there is shown a temperature compensating network 38 which consists of a second diode 39 and a second resetting resistor 40 in parallel. The other side of the temperature compensating network is connected to a second detecting transistor 41 also of the N-P-N junction type and to the positive side 11 of the source by way of a second bias resistor 42. The emitter of the transistor 41 is connected to the junction of the bridge resistors 36 and 37 by way of a second limiting resistor 43. The collector of the transistor 41, similarly as in the first bridge, is connected to the positive side of the source 11 by way of a second load resistor 44 and to the base of a second amplifying transistor 45, which is in all respects equivalent to 29. The emitter of the transistor 45 is connected to the junction of a second pair of range limiting resistors 46 and 47 and to the emitter of the second detector transistor 41 by way of a second coupling resistor 49. The collector of the transistor 45 is connected in series with a second relay 50 to operate a switch 51 in a second external circuit (not shown).

It will be understood that while the embodiments shown in the accompanying drawing and thus far described are of a practical nature, in theory the invention may be practiced by eliminating the amplifying transistor and its associated circuitry and substituting the relay in place of the load resistors 27 and 44. Further, the output circuits of the foregoing transistors may either depend upon the main power source or include an entirely independent source of direct current flowing through the collector-emitter path.

In standby operation, referring to either Fig. 1 or Fig. 2, the resistance of the thermistor 12 is very high, usually in excess of 1,000,000 ohms, relative to the value of 14, herein selected as 10,000 ohms. With respect to the negative conductor 10, the potential at the point X then is very high, and transistor 25 is in a fully conducting state, current flowing from the positive conductor 11 of the source through resistor 27, the collector-emitter circuit of transistor 25, the limit resistor 26 and the rheostat 16 to the negative pole 10 of the source. By assigning a relatively large resistance value to the resistor 27 as compared with the sum of the resistances of the resistors 26 and 16, the potential of the collector of the transistor 25 is relatively low with respect to the negative conductor 10. Since there is a direct connection between the collector of transistor 25 to the base of transistor 29 their potential will be equivalent. By selecting values of the resistors 31 and 32 more nearly equivalent, the potential of their junction with respect to the negative conductor 10 will be greater than that of the base of transistor 29. Consequently, transistor 29 will be rendered non-conductive and the relay 34 will remain in the non-energized, or relaxed position.

Under the condition of excess heat, such as is experienced during a smoldering blaze which causes the temperature of the thermistor 12 to rise, and consequently lowers its resistance due to its negative coefficient of resistivity, the potential at the point X decreases with respect to the negative conductor 10 and when within a restricted band the base of transistor 25 lowers with respect to its emitter. If and when it becomes less than that of the emitter, the transistor ceases to conduct, and the impedance of its output increases greatly. In consequence, the potential of the collector of the transistor 25 (and the base of 29) increases with respect to that of the emitter of the transistor 29 to render the same conductive. A current flows through the relay 34 to provide energization of the external circuit by the switch 35 to sound an alarm. Simultaneously, it will be seen that the potential of the emitter, with respect to the negative conductor 10 immediately increases due to the decrease in impedance of the output circuit of the transistor 29. This voltage change, when fed back to the emitter of the transistor 25 through the resistor 30 provides for greater voltage differential between the emitter and the base of the transistor 25 to insure a bi-stable circuit, eliminating any tendency toward linear operation.

When the excess temperature condition has been corrected, and the resistance of the thermistor rises, the potential at the point X again becomes large with respect to the negative conductor 10 and with respect to the junction of the resistors 15 and 16. A positive voltage drop is impressed across the base-emitter circuit of the transistor 25 and the same once again is rendered conductive. As soon as the potential of the collector of the transistor 25 drops with respect to the negative conductor 10, which, through a reverse chain of the foregoing events, causes the cessation of conduction of the transistor 29 and consequent deenergization of the relay 34. Again, feedback through the resistor 30 provides bi-stable operation, to the elimination of any cycling or hunting.

The function of the voltage dividing bias resistor 19 is to provide constant current through the input circuit in standby condition to saturate the transistor 25 for full conduction. The function of the resetting resistor 24 is to provide a current path against the diode conducting direction to minimize the effect of leakage variations in the diode and capacitor upon restoration of the standby condition. The load resistor 27 maintains the amplifier transistor 29 under the control of the detecting transistor 25 by allowing the collector thereof to vary in potential. The limiting resistor 26 serves a similar function by preventing full grounding of the emitter of transistor 25 should the rheostat become zeroed inadvertently. The inclusion of the diode 21 compensates for inherent frailties of transistors as currently available, since input characteristics of transistors vary in accordance with ambient temperature. Accordingly, the placement of this diode, preferably of the same material and construction, back-to-back with the detecting transistor base provides for bucking leakage paths to maintain operation constant with respect to ambient temperature changes.

Where operation is desired upon rapid temperature changes or contact with rapidly propagated blazes, a rate sensitive element is required. This function is fulfilled by the inclusion of an appropriately selected capacitor 22.

In operation, a capacitor may be visualized as acting instantaneously like a storage battery. As the potential at the point X with respect to the negative conductor 10 drops, the voltage drop across the capacitor 22 remains momentarily constant thus momentarily reducing the control bias on transistor 25. If the condition is of sufficient severity, the system reverses, the transistor 25 ceases to conduct, the transistor 29 commences to conduct, and an alarm is sounded. By virtue of the feedback coupling, the alarm will continue to function if the series of aforementioned events occurs within a limited temperature band below the overtemperature unbalance point as determined by component magnitude adjustment and relative size.

In Fig. 2 of the drawing, a combination of rate and overtemperature sensitive circuitry provides a three way indication as to the state of a condition at a remote location.

Being controlled by a rate-sensitive circuit, the relay 34 may be so devised to indicate both rapidly propagated blaze or smoldering fire. The relay 50, is controlled by a fixed temperature trip point only. If the unbalance point of the second bridge is set, temperaturewise, (rheostat 37) below that of the first bridge (rheostat 16) to thereby indicate overheat rather than a smoldering fire, it can be shown that any of three items of intelligence may be indicated. First, a signal by the circuit controlled by the switch 35 alone indicates rate or a rapidly propagated blaze. Second, a signal by the circuit controlled by the switch 51 alone indicates an undesirable overheat condition. Third, an indication controlled by the switch 51 shortly followed by an indication controlled by the switch 35 may be considered a smoldering fire condition. This foregoing information, broken up into categories, is of particular use to aircraft pilots to guide their actions under emergency conditions.

It will thus be seen from the foregoing that the present invention provides a stable system, lacking in any moving part which may affect sensitivity or accuracy, and lacking in bulky and delicate electron tubes which require shock isolation.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. In a condition responsive system, the combination of a source of unidirectional current, first and second resistance elements connected in series across said source, third and fourth resistance elements connected in series across said source, said elements having resistance values to provide a voltage dividing bridge normally unbalanced in one direction and one of said elements being constructed and arranged so that the resistance thereof changes in response to a predetermined condition to another value whereby the bridge goes towards unbalance in the opposite direction, a transistor having one of its input electrodes connected to the junction of said first and second elements through conductive elements adapted to pass a continuous direct current and having the other of its input electrodes connected to the junction of said third and fourth elements through conductive elements adapted to pass a continuous direct current and having its collector connected for supply of current thereto, and an electrically operable device connected to be controlled by the output of said transistor.

2. A condition responsive system in accordance with claim 1, wherein an ambient temperature compensating network provides the connection between the input electrode of said transistor and the junction between said first and second resistance elements, said network including a diode and a limiting resistor arranged in parallel.

3. A condition responsive system in accordance with claim 1, wherein a rate sensitive resistor capacitor network provides the connection between the junction of said first and second resistance elements and the input electrode of said transistor, said network including a capacitor and a limiting resistor arranged in parallel.

4. A condition responsive system according to claim 1, wherein a second transistor is connected between said first transistor and said device to provide bi-stable operation of said system.

5. In a condition responsive system, the combination of a source of unidirectional current having a positive side and a negative side, first and second resistance elements connected in series across said source from negative to positive, third and fourth resistance elements connected in series across said source from negative to positive, said elements having resistance values to provide a voltage dividing bridge normally unbalanced in one direction and said first element being constructed and arranged so that the resistance thereof changes in response to a predetermined condition to another value whereby the bridge goes towards unbalance in the opposite direction, a transistor having one of its input electrodes connected to the junction of said first and second elements through conductive elements adapted to pass a continuous direct current and having the other of its input electrodes connected to the junction of said third and fourth elements, through conductive elements adapted to pass a continuous direct current, a load resistor connecting the collector of said transistor to one side of said source, fifth and sixth resistance elements connected in series across said source, a second transistor having one of its input electrodes connected to the collector of said first transistor and having the other of its input electrodes connected to the junction of said fifth and said sixth resistance elements and being coupled in feedback relationship to the input electrode of said first transistor, connected to the junction of said third and fourth resistance elements and an electrically operable device connected between the collector of said second transistor and one side of said source.

6. A condition responsive system in accordance with claim 5, wherein an ambient temperature compensating network provides the connection between the input electrode of said transistor and the junction between said first and second resistance elements, said network including a diode and a limiting resistor arranged in parallel.

7. A condition responsive system in accordance with claim 5, wherein a rate sensitive resistor capacitor network provides the connection between the junction of said first and second resistance elements and the input electrode of said transistor, said network including a capacitor and a limiting resistor arranged in parallel.

8. In a condition responsive system, the combination of a source of unidirectional current, a first voltage dividing bridge comprising first and second resistance elements connected in series across said source and third and fourth resistance elements connected in series across said source, a second voltage dividing bridge comprising said first and second resistance elements and fifth and sixth resistance elements connected in series across said source, both of said bridges being normally unbalanced in one direction at different values, and said first resistance element being constructed and arranged so the resistance thereof changes to other values in response to predetermined changes in condition whereby said bridges go independently toward unbalance in the opposite direction, a first transistor having one of its input electrodes connected to the junction of said first and second resistance elements through conductive elements adapted to pass a continuous direct current and having its other input electrode connected to the junction of said third and fourth elements through conductive elements adapted to pass a continuous direct current and having its collector connected for supply of current thereto, a first electrically operable device connected to be controlled by the output of said first transistor, a second transistor having one of its input electrodes connected to the junction of said first and second resistance elements through conductive elements adapted to pass a continuous direct current and having the other of its input electrodes connected to the junction of said fifth and sixth resistance elements through conductive elements adapted to pass a continuous direct current and having its collector connected for supply of current thereto, and a second electrically operable device connected to be controlled by the output of said second transistor.

9. A condition responsive system in accordance with claim 8, wherein a rate sensitive resistor capacitor network provides the connection between the junction of said first and second resistance elements and the input electrode of said first transistor, said network including a capacitor and a limiting resistor arranged in parallel.

10. A condition responsive system in accordance with claim 1, wherein a diode provides the connection between the input electrode of said transistor and the junction of said first and second resistance elements.

11. A condition responsive system in accordance with claim 10, wherein a fifth resistance element is connected between one side of said source and the junction of said diode and the input electrode of said transistor.

12. A condition responsive system in accordance with claim 10, wherein a capacitor is connected in parallel with said diode.

References Cited in the file of this patent

UNITED STATES PATENTS

| | | |
|---|---|---|
| 2,217,797 | Donovan | Oct. 15, 1940 |
| 2,686,293 | Davis | Aug. 10, 1954 |